United States Patent
Clavien et al.

(10) Patent No.: US 11,785,938 B2
(45) Date of Patent: *Oct. 17, 2023

(54) PERFUSION LOOP ASSEMBLY FOR AN EX-VIVO LIVER PERFUSION AND A LIVER CHAMBER ASSEMBLY

(71) Applicants: ETH Zurich, Zurich (CH); Universität Zurich, Zurich (CH)

(72) Inventors: Pierre-Alain Clavien, Kilchberg (CH); Philipp Rudolf von Rohr, Basel (CH); Philipp Dutkowski, Ohningen (DE); Rolf Graf, Zurich (CH); Martin Schuler, Zurich (CH); Dilmurodjon Eshmuminov, Rudolfstetten (CH); Brian Burg, Paris (FR)

(73) Assignees: ETH Zurich, Zürich (CH); Universität Zurich, Zurich (CH)

( * ) Notice: Subject to any disclaimer, the term of this patent is extended or adjusted under 35 U.S.C. 154(b) by 471 days.

This patent is subject to a terminal disclaimer.

(21) Appl. No.: 16/319,608

(22) PCT Filed: Jul. 21, 2017

(86) PCT No.: PCT/EP2017/068506
§ 371 (c)(1),
(2) Date: Jan. 22, 2019

(87) PCT Pub. No.: WO2018/015548
PCT Pub. Date: Jan. 25, 2018

(65) Prior Publication Data
US 2020/0253194 A1    Aug. 13, 2020

(30) Foreign Application Priority Data
Jul. 22, 2016    (EP) .................................. 16180837

(51) Int. Cl.
*A01N 1/02*    (2006.01)

(52) U.S. Cl.
CPC .................................. *A01N 1/0247* (2013.01)

(58) Field of Classification Search
CPC ... A01N 1/0247; A01N 1/0226; A01N 1/0215
See application file for complete search history.

(56) References Cited

U.S. PATENT DOCUMENTS 3,515,370 A * 6/1970 Jester ...................... F16K 47/04
                                                    251/120
4,192,308 A * 3/1980 Michaels ............. A61K 9/0004
                                                    604/892.1

(Continued)

FOREIGN PATENT DOCUMENTS

CN    1543785 A    11/2004
CN    103719075 A    4/2014

(Continued)

OTHER PUBLICATIONS

Kaiser et al., "Die Entwicklung eines leichten, automatisch gesteuerten Lappen-Containers zum Direkttransfer und zur warmen Langzeitkonservierung freier, mikrochirurgischer Lappen", Feldmann et al., European Archives of Oto-Rhino Laryngology-Sitzungsbericht, Berlin, 1994, pp. 276-277.

(Continued)

*Primary Examiner* — William H. Beisner
*Assistant Examiner* — Danielle B Henkel
(74) *Attorney, Agent, or Firm* — THE WEBB LAW FIRM

(57) ABSTRACT

The present invention relates to a perfusion loop assembly for an ex vivo liver perfusion including: a pump for providing a fluid flow of a perfusion fluid through a first branch line and a second branch line; the first branch line being configured to provide a first portion of the perfusion fluid to the hepatic artery of the liver; the first branch line being coupled with a first gas exchanger, the second branch line being configured to provide a second portion of the perfu- (Continued)

sion fluid to the portal vein of the liver; the second branch line further including a first valve for controlling the flow of the perfusion fluid into the portal vein of the liver, a liver chamber assembly configured to hold the liver ex vivo, a liver outlet line attached to the vena cava of the ex vivo liver, at least one reservoir connected to the liver outlet and upstream from the pump.

18 Claims, 7 Drawing Sheets

(56) References Cited

U.S. PATENT DOCUMENTS

| | | | |
|---|---|---|---|
| 5,141,847 | A | 8/1992 | Sugimachi et al. |
| 5,786,136 | A | 7/1998 | Mayer |
| 5,856,081 | A * | 1/1999 | Fahy .................. A01N 1/02 |
| | | | 435/284.1 |
| 5,890,518 | A | 4/1999 | Fischerkeller |
| 7,410,474 | B1 * | 8/2008 | Friend .................. A01N 1/02 |
| | | | 435/284.1 |
| 7,572,622 | B2 | 8/2009 | Hassanein et al. |
| 7,811,808 | B2 | 10/2010 | van der Plaats et al. |
| 7,977,042 | B2 | 7/2011 | Lee et al. |
| 8,287,580 | B2 | 10/2012 | Rakhorst et al. |
| 8,927,257 | B2 | 1/2015 | Hutzenlaub et al. |
| 8,986,978 | B2 * | 3/2015 | Brassil ............... A01N 1/0247 |
| | | | 435/284.1 |
| 9,457,179 | B2 | 10/2016 | Hassanein et al. |
| 9,756,848 | B2 | 9/2017 | van der Plaats et al. |
| 10,076,112 | B2 | 9/2018 | Hassanein et al. |
| 10,362,780 | B2 | 7/2019 | Kay et al. |
| 10,433,538 | B2 | 10/2019 | Fontes et al. |
| 10,634,686 | B2 | 4/2020 | Chaves Fontes et al. |
| 2005/0147958 | A1 * | 7/2005 | Hassanein ............ A01N 1/021 |
| | | | 435/1.1 |
| 2006/0148062 | A1 | 7/2006 | Hassanein et al. |
| 2007/0009881 | A1 | 1/2007 | Arzt et al. |
| 2007/0048725 | A1 | 3/2007 | Arrington |
| 2008/0017194 | A1 | 1/2008 | Hassanein et al. |
| 2009/0197240 | A1 | 8/2009 | Fishman et al. |
| 2010/0117011 | A1 | 5/2010 | Kitano et al. |
| 2011/0065170 | A1 | 3/2011 | Fondevila Campo et al. |
| 2012/0213798 | A1 | 8/2012 | Levy et al. |
| 2013/0011823 | A1 | 1/2013 | Hassanein et al. |
| 2013/0177972 | A1 | 7/2013 | Green et al. |
| 2014/0011182 | A1 * | 1/2014 | Van Sickle .......... A01N 1/0289 |
| | | | 435/284.1 |
| 2014/0017658 | A1 * | 1/2014 | Steinman ............ A61M 1/3638 |
| | | | 435/284.1 |
| 2014/0017662 | A1 | 1/2014 | Kravitz et al. |
| 2014/0308654 | A1 | 10/2014 | Kay et al. |
| 2014/0377849 | A1 * | 12/2014 | Kay .................. A01N 1/021 |
| | | | 435/284.1 |
| 2015/0004677 | A1 * | 1/2015 | Kay ................... A01N 1/0247 |
| | | | 435/284.1 |
| 2015/0173348 | A1 | 6/2015 | Brasile |
| 2015/0342177 | A1 | 12/2015 | Hassanein et al. |
| 2016/0262634 | A1 * | 9/2016 | Steen ................. A61B 5/02028 |
| 2017/0339945 | A1 | 11/2017 | Freed |
| 2019/0141988 | A1 | 5/2019 | Kobayashi et al. |
| 2020/0375178 | A1 * | 12/2020 | Becker ............... A01N 1/0226 |

FOREIGN PATENT DOCUMENTS

| | | |
|---|---|---|
| CN | 105379707 A | 3/2016 |
| CN | 205124849 U | 4/2016 |
| CN | 105660604 A | 6/2016 |
| CN | 206403020 U | 8/2017 |
| DE | 2603139 A1 | 8/1976 |
| EP | 702515 B1 | 6/1994 |
| EP | 2133610 A1 | 12/2009 |
| EP | 2633755 A1 | 9/2013 |
| EP | 2009986 B1 | 4/2015 |
| EP | 2203046 B1 | 5/2015 |
| EP | 3459351 A1 | 3/2019 |
| WO | 2005022995 A1 | 3/2005 |
| WO | 2007014380 A2 | 2/2007 |
| WO | 2008108996 A1 | 9/2008 |
| WO | 2009138446 A2 | 11/2009 |
| WO | 2011050459 A1 | 5/2011 |
| WO | 2011062621 A2 | 5/2011 |
| WO | 2013029044 A1 | 2/2013 |
| WO | 2013032319 A1 | 3/2013 |
| WO | 2013068753 A1 | 5/2013 |
| WO | 2014001592 A1 | 1/2014 |
| WO | 2014059316 A1 | 4/2014 |
| WO | 2015042602 A1 | 3/2015 |
| WO | 2015187737 A1 | 12/2015 |
| WO | 2016090498 A1 | 6/2016 |
| WO | 2017200089 A1 | 11/2017 |
| WO | 2018015548 A2 | 1/2018 |
| WO | 2019141809 A1 | 7/2019 |

OTHER PUBLICATIONS

Schön et al., Liver Transplantation After Organ Preservation with Normothermic Extracorporeal Perfusion, Ann. Surg., Jan. 2001, pp. 114-123, vol. 233, No. 1.
Boyer, "Bile Formation and Secretion", Comprehensive Physiology, 2013, vol. 3(3), pp. 1035-1078.
Chen et al., "Coalescence-Induced Jumping of Multiple Condensate Droplets on Hierarchical Superhydrophobic Surfaces", Scientific Reports, 2016, 11 pages.
Chouchani et al., "Ischaemic accumulation of succinate controls reperfusion injury through mitochondrial ROS", Nature, 2014, vol. 515, pp. 431-435.
Dash et al., "Erratum to: Blood HbO2 and HbCO2 Dissociation Curves at Varied O2, CO2, pH, 2,3-DPG and Temperature Levels", Annals of Biomedical Engineering, 2010, vol. 38, No. 4, pp. 1683-1701.
Fitzgerald et al., "Assessment of Renal Ischemia by Optical Spectroscopy", Journal of Surgical Research, 2004, vol. 122, pp. 21-28.
Golse et al., "Arterial Lactate Concentration at the End of Liver Transplantation is an Early Predictor of Primary Graft Dysfunction", Annals of Surgery, 2018, 8 pages.
Hoefeijzers et al., "The Pulsatile Perfusion Debate in Cardiac Surgery: Answers From the Microcirculation?", Journal of Cardiothoracic and Vascular Anesthesia, 2015, vol. 29, No. 3, pp. 761-767.
Hohenester et al., "A Biliary HCO3 2 Umbrella Constitutes a Protective Mechanism Against Bile Acid-Induced Injury in Human Cholangiocytes", Hepatology, 2012, vol. 55, pp. 173-183.
Imber et al., "Advantages of Normothermic Perfusion Over Cold Storage in Liver Preservation", Transplantation, 2002, vol. 73, No. 5, pp. 701-709.
Imber et al., "Optimisation of Bile Production during Normothermic Preservation of Porcine Livers", American Journal of Transplantation, 2002, vol. 2, pp. 593-599.
Jablonski et al., "Studies On the Isolated Perfused Pig Liver", Br J Surg, 1971, vol. 58(2) pp. 129-137.
Kahl et al., "Critical Role of Flavin and Glutathione in Complex I-Mediated Bioenergetic Failure in Brain Ischemia/Reperfusion Injury", Stroke, 2018, vol. 49, pp. 1223-1231.
Kanno et al., "Regulation of cholangiocyte bicarbonate secretion", Am J Physiol Gastrointest Liver Physiol, 2001, vol. 281, G612-G625.
Macheroux, "Flavoprotein Protocols", Methods in Molecular Biology, Humana Press Inc., 1999, vol. 131, 246 pages.
Steinacher et al., "Therapeutic Mechanisms of Bile Acids and Nor-Ursodeoxycholic Acid in Non-Alcoholic Fatty Liver Disease", Digestive Diseases, 2017, vol. 35, pp. 282-287.
Trauner et al., "Potential of nor-Ursodeoxycholic Acid in Cholestatic and Metabolic Disorders", Digestive Diseases, 2015, vol. 33, pp. 433-439.
Barbas et al., "Ex-vivo liver perfusion for organ preservation: Recent advances in the field", Transplantation Reviews, 2016, pp. 154-160, vol. 30.

(56) References Cited

OTHER PUBLICATIONS

Op Den Dries et al., "Ex vivo Normothermic Machine Perfusion and Viability Testing of Discarded Human Donor Livers", American Journal of Transplantation, 2013, pp. 1327-1335, vol. 13.
Ravikumar et al., "Normothermic liver preservation: a new paradigm?", Transplant International, 2015, pp. 690-699, vol. 28.
Vekemans et al., "Artificial Circulation of the Liver: Machine Perfusion as a Preservation Method in Liver Transplantation", The Anatomical Record, 2008, pp. 735-740, vol. 291.

* cited by examiner

PERFUSION LOOP ASSEMBLY FOR AN EX-VIVO LIVER PERFUSION AND A LIVER CHAMBER ASSEMBLY

CROSS-REFERENCE TO RELATED APPLICATIONS

This application is the United States national phase of International Application No. PCT/EP2017/068506 filed Jul. 21, 2017, and claims priority to European Patent Application No. 16180837.3 filed Jul. 22, 2016, the disclosures of each of which are hereby incorporated by reference in their entirety.

BACKGROUND OF THE INVENTION

Field of the Invention

The disclosure relates to a perfusion loop assembly for an ex vivo liver perfusion and a liver chamber assembly.

Description of Related Art

Worldwide over half a million new patients are diagnosed with primary cancer in the liver each year. Furthermore, the liver is the primary site of metastases for most cancers. The majority of those patients are incurable.

The concept that the liver has the ability to regenerate has been known for centuries. Liver resection (surgical removal of the diseased part of the liver) for the treatment of liver cancer has been carried out for a few decades.

However, many patients still cannot benefit from liver surgery because the removal of a too large piece of the liver leads to death.

The organ donor pool shortage is increasing in western countries. New strategies are required to alleviate current donor organ shortage. The ability of the liver to regenerate could also be used in liver transplantation to increase the donor pool, where a healthy donor liver will be split into a couple of parts that will be grown in the perfusion machine and transplanted into more than one patient.

Perfusion systems are known from Ravikumar et. al. "*Normothermic liver preservation: a new paradigm?*", Steunstichting ESOT 28 (2015), 690-699, U.S. Pat. No. 7,410,474 B1, WO 2013/032319 A1 and WO 2015/187737 A1.

Systems and methods are needed to extend the viability of liver tissue outside of the body and allow its growth (e.g. enabling liver regeneration systems and methods)

SUMMARY OF THE INVENTION

It is an issue to provide a system and a method to extend the viability of the liver, outside of the body, ex vivo. Such a system would allow patients with formerly non-resectable livers to be able to get a re-transplantation of their own liver tissue. Using autologous instead of allogenic liver transplantation will reduce the need for lifelong immunosuppression, which is associated with severe side effects.

This object is being addressed with perfusion loop assemblies and liver chamber assemblies and further systems as described in the following.

Perfusion Loop Assembly

Thus, a perfusion loop should be provided that is connected to the liver by suitable means such as cannulas. The liver should be connected to the perfusion loop via two inlet ports, in particular via the hepatic artery and the portal vein, and via one outlet port, in particular through the vena cava.

Taking this under consideration there is provided according to a first aspect, a first perfusion loop for perfusing a liver ex-vivo that comprises:
- at least one pump, in particular only one pump for providing a fluid flow of a perfusion fluid through a first branch line and a second branch line;
- the first branch line being configured to provide a first portion of the perfusion fluid to the hepatic artery (arteria hepatica propria or arteria hepatica communis) of the liver; the first branch line being coupled with at least one first gas exchanger,
- the second branch line being configured to provide a second portion of the perfusion fluid to the portal vein (vena portae hepatis) of the liver; the second branch line further comprising at least one first valve for controlling the flow of the perfusion fluid into the portal vein of the liver,
- a liver chamber assembly configured to hold the liver ex vivo,
- a liver outlet line attached to the vena cava (vena cava inferior) of the ex vivo liver,
- at least one reservoir connected to the liver outlet line and upstream from the at least one pump.

According to a second aspect a second perfusion loop for perfusing a liver ex-vivo is provided that comprises:
- at least one pump, in particular only one pump for providing a fluid flow of a perfusion fluid,
- at least one (third) gas exchanger downstream of the at least one pump,
- downstream from the at least one third gas exchanger the perfusion fluid flow being split into a first branch line and a second branch line;
- the first branch line being configured to provide a first portion of the perfusion fluid to the hepatic artery (arteria hepatica propria or arteria hepatica communis) of the liver;
- the second branch being configured to provide a second portion of the perfusion fluid to the portal vein (vena portae hepatis) of the liver; the second branch line further comprising at least one first valve for controlling the flow of the perfusion fluid into the portal vein of the liver,
- a liver chamber assembly configured to hold the liver ex vivo,
- a liver outlet line attached to the vena cava (vena cava inferior) of the ex vivo liver,
- at least one reservoir connected to the liver outlet line and upstream from the at least one pump.

The perfusion loop assemblies are able to provide necessary nutrients, metabolites, hormones, medications, electrolytes, proteins and gas supply, in particular oxygen supply, and are equipped to monitor growth, as well as assess the functional capacity of the liver outside of the body, e.g. regeneration. This will allow patients with formerly inoperable liver cancers to gain access to surgical resection. Additionally, performing autologous transplantation (patient receives liver tissue from his own body) will avoid the need for life-long immunosuppression and its associated severe side effects. The present regeneration strategy can also be used in allogenic liver transplantation (patient receives liver tissue from a donor) for end-stage chronic liver disease, where an organ transplant is the only treatment option. In this second approach, a healthy donor liver will be split into multiple parts, preferably between 2 and 5 parts or even up to 7 parts that will be grown in the perfusion machine, yielding multiple transplantable organs with sufficient critical size. With this approach, the organ donor pool would be increased, which would help to alleviate current donor organ shortage.

Both embodiments of the perfusion loop assemblies as described above have in preferred embodiments only one pump and one gas exchanger (oxygenator) for the complete perfusion loop. The perfusion flow is split downstream of the pump and divided into a hepatic artery branch and portal vein branch. The use of only one pump and only one gas exchanger (oxygenator) reduces the overall hemolysis of the blood continuously pumped through the loop.

Besides the one pump both perfusion loop embodiments comprise at least one valve in the second branch line, i.e. the portal vein branch (i.e. after the splitting or division of the perfusion flow).

In one embodiment the first branch line, the second branch line and/or the liver outlet line comprise an interface, in particular a cannulation with the hepatic artery of the liver; the portal vein and/or the vena cava respectively. These interfaces can efficiently be made.

For an efficient control one embodiment of the perfusion loop assembly comprises a first branch line, a second branch line and/or an outlet line with at least one flow rate sensor and/or at least one pressure sensor. In a further embodiment data from the sensors is transmitted to a control system for monitoring and/or controlling the perfusion loop assembly.

It is to be understood that in the context of the present embodiments the pressure values provided further below always refer to the mean pressure. Furthermore, the pressure should always be measured as close as possible to the liver vessels or liver ports (portal vein PV, hepatic artery HA, vena cava VC). Preferably, there should be no further branch or junction at the liver vessels subsequent to the measuring points for the flow rate; in this manner the exact flow rate through the liver is known.

In another embodiment the second branch line comprises at least one second gas exchanger, in particular downstream of the at least one pump.

In an embodiment of the perfusion loop assembly the at least one valve in the second branch line is a proportional pinch valve that is e.g. continuously adjustable by a control system. Pinch valves (or also gate clamps) can regulate the flow or pressure by squeezing the tubes and restricting the flow cross section. The proportional pinch valve is controlled by the position of a linear motor. The linear motor can open and close the pinch valve in a continuous range from 0 to 100%.

Thus, a control system is established that controls both liver inlets and outlet independently based on fixed flow rate or pressure setpoints by adjusting the pump, e.g. by adjusting a centrifugal pump impeller rotation speed and by opening and closing the proportional pinch valve in the second portal vein branch and a further pinch valve in the vena cava branch (described in more detail below).

This is possible because two active elements (pump and proportional pinch valve) control two independent flow branches (hepatic artery and portal vein). The control system continuously ensures that the defined set points with respect to flow rate and/or pressure are maintained by adjusting the active elements. The system does not require manual intervention nor manual oversight. Fixed flow rates or pressures can be maintained throughout the perfusion duration.

Alternatively to continuous flow, subtle centrifugal pump impeller rotation speed variation induces a pulsatile flow in the hepatic artery liver inlet branch. Custom shaped pulsatile flow analogous to the like introduced by heart pulsation can be induced. The frequency of the pulsatile flow is in the range of 0.1 to 10 Hz, more specifically 1 Hz. The pressure variation of the pulsatile flow (from mean pressure) is in the range of −40 to +40 mm Hg. Flow pulsation in the portal vein liver inlet branch can be reduced or eliminated by opening of the proportional pinch valve. As an additional measure a snubber or an expansion reservoir can be used for this purpose as well.

As described above each of the perfusion loop assembly variants comprises at least one gas exchanger, in particular an oxygenator. The oxygenator may be a membrane oxygenator with an integrated heat exchanger. In the first variant according to claim 1 the oxygenator is arranged solely in the first hepatic artery branch. This is the most physiological approach.

However, in this first perfusion loop variant it is also possible to provide additionally a second gas exchanger (i.e. oxygenator) in the second portal vein branch, in particular downstream of the at least one pump and upstream of the at least one valve.

In the second variant according to claim 2 of the perfusion loop assembly there is preferably only one oxygenator provided downstream of the at least one pump and upstream of the flow divider. In this case the oxygenator is used before the perfusion flow is split or divided into the hepatic artery branch and portal vein branch.

As mentioned above, the present perfusion loops the first branch comprises at least one flow meter and/or at least one pressure sensor and a connecting element to the hepatic artery of the liver. The position of the flow meter and/or pressure sensor can vary and is adapted to specific requirements.

The flow rate in the hepatic artery is in the range of 0 to 1000 ml/min, specifically 200 to 500 ml/min, more specifically 300 to 400 ml/min. For example the flow rate in the hepatic artery may be 25 ml/min per 100 liver tissue. The flow rate is measured by flow rate sensors, for example by ultrasonic techniques. The mean pressure in the hepatic artery is in the range of 0 to 200 mmHg, specifically 50 to 120 mmHg, more specifically 80 to 100 mmHg, and even more specifically between 60 and 90 mmHg. The pressure is measured relative to the atmospheric pressure by pressure sensors, for example by piezoresistive techniques. In one variant the systolic pressure may be up to 150 mmHg and the diastolic pressure may be ≥40 mmHg, preferably between 60 and 90 mmHg.

Furthermore, the second branch comprises at least one flow meter, in particular downstream of the valve and/or at least one pressure sensor, in particular downstream of the valve and the flow meter and a connecting element to the portal vein of the liver. The flow rate in the portal vein is in the range of 0 to 2 l/min, specifically 0.75 to 1.2 l/min, more specifically 0.8 to 1 l/min. For example the flow rate in the portal vein may in a range of 75 ml/min to 120 ml/min per 100 g liver tissue. The pressure in the portal vein is in the range of 0 to 20 mmHg, specifically 1 to 12 mmHg, more specifically 5 to 10 mmHg.

In a specific embodiment the flow rate in the hepatic artery is 0.2-0.6 l/min at a pressure between 60 and 90 mmHg and the flow rate in the portal vein is 0.8-1.2 l/min at a pressure of about 5 mmHg.

Due to the different pressures and flow rates applied to the hepatic artery and portal vein it is ensured that the flow resistance in the hepatic artery $R_{HA}$ is larger than the resistance in the portal vein $R_{PV}$ (i.e. $R_{HA} \gg R_{PV}$) mimicking the physiological set up.

In general flow measurements may be taken at all inlet and outlet lines of the perfusion loop. Pressure measurements may be taken as close as possible to the liver in order to avoid any adverse effects of the pressure drop caused within the perfusion loop tubes or altitude differences between liver and sensor.

The flow and pressure values may be used in a flow control algorithm within the control system that continuously acts upon actuator settings (such as pump or valve settings) to ensure a given setpoint. The setpoint can be a flow rate or a pressure in the perfusion loop. The setpoint can be altered any time during perfusion. This approach ensures that physiological flow and pressure conditions for the liver can be set, established and controlled. Since the liver does have dynamic behavior under perfusion, the control of the perfusion parameters through a control system, including e.g. the medication administered to the perfusion loop and/or the liver is beneficial. The medication (e.g. vasodialators, vasoconstrictors) can influence the flow rate and/or pressure drop through the liver.

As described above the perfusion loop embodiments comprise at least one reservoir. Such a reservoir (as a closed system) is required for absorbing the volume change in the perfusion media originating from possible fluid absorption in the liver. It is also possible that the liver gives off fluid.

In a further embodiment of the present perfusion loop assembly the at least one reservoir is a hard shell reservoir or a soft shell reservoir, like a blood bag, close to liver outlet (vena cava). The volume of the reservoir, such as a blood bag can be in the range of 0 to 5 l, more specifically, 0.25 to 3 l. The fill level of the reservoir is dependent on the perfusion media volume in the system and can change over the duration of perfusion due to the absorption and desorption of fluid by the liver. The fill level can be monitored and measured by sensing elements, for example by a gravimetric balance. Fill level and height of the reservoir in conjunction with the vena cava pinch valve determine the outlet pressure of the liver at the vena cava.

Furthermore, the height of the at least one reservoir relative to the liver may be controlled and adjusted. The height adjustment of the reservoir can be done by a linear motor or by a winch.

In an embodiment the regular reservoir height variation is in the range of 0 to +/−20 cm, more specifically 0 to +/−5 cm. The height adjustment of the reservoir, such as a soft shell reservoir may be in the range of 0 to +/−1 m, more specifically +/−20 to +/−60 cm. The frequency of the regular reservoir height variation is in the range of 0.1 to 1 Hz.

Said adjustment of the reservoir height is beneficial since this enables a control or variation of the pressure (together with a pinch valve, see below) at liver outlet (vena cava). This allows for creating physiological pressure conditions at liver outlet. Physiological pressure conditions are essential for fluid exchange in the liver. By adjusting the height of the reservoir and the fill level of the reservoir a pressure may be applied or imposed on the liver outlet. A controlled reservoir and height variation by a linear motor can induce liver outlet pressure variation. Besides, a pressure pulsation analogous to heart pulsation and breathing can be induced.

It is preferred, if the pressure in the vena cava is adjusted to a range of −10 to 10 mmHg, more specifically −5 to 5 mmHg. The pressure is measured by pressure sensors, for example by piezoresistive techniques.

Furthermore, a control system may be provided that controls the pressure in the vena cava liver outlet branch based on a fixed pressure setpoint by adjusting the height of the soft shell reservoir. The system allows a fixed vena cava liver outlet pressure that can be maintained throughout the perfusion duration.

Moreover, a control system may be provided that controls a desired pressure variation in the vena cava liver outlet branch by alternatingly adjusting the height of the soft shell reservoir. The system allows physiological vena cava liver outlet pressure variations that can be maintained throughout the perfusion duration.

Such a control system for pressure (and thus flow rate) in the vena cava outlet is established by at least one pinch valve (vena cava pressure control, VCPC) that is arranged in the vena cava line downstream of the liver. Specifically, the pressure is measured close to or at the vena cava outlet using a (third) pressure sensor and is regulated by the at least one pinch valve located downstream of said pressure sensor. In one embodiment the pinch valve in the vena cava line allows to adjust the pressure at the vena cava outlet such that physiological pressure variations are generated in the vena cava as created by breathing. For example, during one breath sequence the pressure in the vena cava varies between +15 and −10 mmHg when inhaling and exhaling.

The reservoir can conceivably also be attached to any other position (than close to the vena cava outlet) in the perfusion loop with similar effect, such as the portal vein branch.

In a further embodiment the perfusion loop assembly comprises at least one port for medication and/or fluid (e.g. blood) retrieval for analysis. All medication ports may comprise at least one filter system to prevent any bacterial infection. The supply of medication to the loop perfusion assembly and/or the retrieval of samples can be controlled or monitored by the control system.

In another preferred embodiment of the present perfusion loop assembly at least one branch as bypass can be included in the loop design (in particular the loop design with only one oxygenator) in order to ensure sufficient oxygen saturation in the portal vein branch. Insufficient oxygen saturation may arise due to high oxygen consumption of the liver and the closed loop design, especially when only the hepatic artery branch is oxygenated The bypass may be directly between the hepatic artery and the portal vein, or indirectly between the hepatic artery and vena cava that may provide better fluid mixing. The bypass can comprise a tube and a clamp or a proportional valve. The bypass branch can be smoothly constricted or expanded in order to ensure a smooth (low pressure gradients along the line) and therefore blood friendly (low hemolysis) pressure change.

In the preferred case the bypass is between hepatic artery and vena cava. Thus, the bypass is provided from the first hepatic artery branch that begins downstream of the gas exchanger to the liver outlet branch past the liver. Such a bypass allows for obtaining physiological oxygenation in hepatic artery (90 to 100% oxygen saturation) and portal vein (70 to 80% oxygen saturation).

In this present bypass solution the at least one oxygenator in the hepatic artery branch fully oxygenates the perfusion media entering the liver through the hepatic artery. The oxygen saturation of blood in the hepatic artery liver inlet branch reaches >90%.

Preferably there is no oxygenator placed in the portal vein liver inlet branch. Therefore, the oxygen saturation of blood in the portal vein liver inlet branch depends on the vena cava liver outlet. If oxygen consumption by the liver is high, oxygen saturation of blood in the vena cava and portal vein may drop below physiological levels (<70%).

By providing said bypass from the hepatic artery branch (high oxygen saturation) to the vena cava branch (low oxygen concentration) past the liver the oxygen saturation of the perfusion media exiting the liver is increased. And since within the present loop the perfusion media in the vena cava enters the portal vein branch and subsequently the liver an increase of the overall oxygen saturation of the blood entering the liver by the portal vein branch to physiological levels (70 to 80%) is provided. The bypass solution allows for a fixed oxygen saturation of the blood in the portal vein inlet branch (or vena cava outlet branch) that can be maintained throughout the perfusion duration.

The amount of perfusion media flowing through the bypass may be controlled by a suitable valve, such as proportional pinch valve. The flow rate through the bypass may be in the range of 0 to 2000 ml/min. The oxygen saturation of the perfusion media in the hepatic artery, portal vein and vena cava is preferably measured by blood gas analysis or a continuous blood gas monitoring system. Furthermore, a control system can be established which controls the oxygen saturation of the portal vein inlet or vena cava outlet branches based on a fixed oxygen saturation set point by adjusting the opening of the said valve located in the bypass. The set point saturation in the vena cava is >70%. In case the concentration of lactate in the system increases the saturation set point is established at a higher level.

The flow throttling in the valve of the portal vein branch, the vena cava and bypass may be accomplished over one or multiple stages, which are made up of individual constrictions. This arrangement allows a more gradual and gentle pressure drop along the perfusion media line, which is beneficial to limit perfusion media damage originating from high pressure gradients, e.g. hemolysis in case of blood.

Further it is possible that at least one monitoring and/or processing device is used for bile and/or ascites produced by the ex vivo liver, in particular for continuous monitoring and/or processing. This can be controlled by the control system.

In another embodiment of the present perfusion loop assembly a dialysis machine is implemented. Said dialysis machine removes toxins and urea from the ascites and reestablishes the electrolyte balance before giving the ascites back to the perfusion media. Within the meaning of the present description, the ascites comprises a liquid that is emitted or delivered from the outer surface of the liver.

In another embodiment of the present perfusion loop assembly a dialysis machine is implemented into the perfusion loop. Said dialysis machine removes toxins and desired substances from the perfusion media.

Ascites production is in the range of 0 to 500 ml/h, more specifically 0 to 200 ml/h. The electrolyte imbalance ($K^+$, $Na^+$, $Cl^-$, $Ca^{2+}$, $PO_4^{3-}$) and urea content in the ascites are identical to the electrolyte imbalance in the perfusion media. Electrolyte imbalance is corrected through the dialysis machine. Urea is removed in the dialysis machine. When giving the treated ascites back to the perfusion media, an improved perfusion media balance is established. By only passing the ascites through the dialysis machine a gentler treatment is possible as not the entire perfusion media is passed through the dialysis machine, which may induce damage to the perfusion media through the filters and roller (or rotor) pump.

The dialysis machine may be provided in the present loop system such that it is connected to the device holding the liver (e.g. liver chamber) and the liver outlet branch (vena cava branch). Said dialysis machine branch may further comprise at least one reservoir for holding the ascite liquid and at least one pump suitable for pumping the ascite liquid.

In yet a further aspect of the present perfusion loop a device for measuring and monitoring the continuous bile production is provided. The present device allows determining the total bile production and bile production rate instantaneously, at all times and for all times. The amount of bile liquid typically produced is between 0 to 50 ml/h, preferably between 10 to 30 ml/h. The present device comprises a scale, at least one flow rate sensor operating in the relevant range or an optical device (for instance a spectrophotometer) for that purpose. In one variant the bile liquid is drained from the liver (for example using a drain tube or cannula) to said monitoring device. It is also preferred if said device for monitoring bile production is connected to a controller and data logging system.

Liver Chamber Assembly

The liver is the largest gland in the human body, accounting for about 2.5% to 3.5% of the body weight of an adult. In the human, the liver is located in the upper right quadrant of the abdomen, below the diaphragm and on top of the stomach. The liver is primarily attached to diaphragm, abdomen and gastrointestinal tract by ligaments. Furthermore, the liver is also hanging on the main blood vessels (inferior vena cava, hepatic veins, portal vein.). There are mainly five ligaments (falciform ligament, cornoary ligament, two triangular ligaments, round ligaments). Moreover, the liver is attached to the stomach and the duodenum by hepatogastric and hepatoduodenal ligaments.

Organ movement of the organs in the thorax and abdomen are mainly due to respiration and cardiac motions. Due to the connection of liver and stomach, the liver is also moved by the motion/displacement of the stomach. The movement of the liver is due to forces acting on the liver that finally leads to compression and decompression on the surface of the liver. Movement respectively displacement occurs in all spatial directions. The main motion of the liver occurs in the superior-inferior direction and is typically in the range of 5 to 50 mm. The movement of the liver inside the human body depends on several factors such as the patient position, dimensions of the human body, breathing conditions, size of the liver, stomach activity and so on. In the body this movement is created by breathing, when air is inhaled or exhaled by the lungs, the beating heart, the motion of the gastrointestinal tract and body movement in general.

In order to extend the viability of the liver outside of the body it would thus be of advantage to apply physiological conditions to the liver storage outside of the body. Thus, device for holding the liver chamber should be able to simulate the physiological conditions of the liver inside the body as close as possible.

This includes first of all storage and positioning of the liver and also movement respectively compression and decompression of the liver surface in order to simulate the physiological liver motion. Furthermore, also the environmental conditions like pressure, temperature and humidity have to be in physiological range. The liver chamber assembly must take the shape, position, arrangement and contact area of the liver in the body into account.

Liver movement/motion/massage improves perfusion media circulation in the liver and enhances the microcirculation inside the small vessels. This helps to achieve a homogeneous perfusion of the entire liver outside of the body (ex vivo). Different mechanisms can be envisioned to achieve this movement of the liver inside the liver chamber assembly. It is thought that liver movement may have an influence on improving blood circulation and distribution. Breathing induces movement of the diaphragm which influences the liver position, shape and compression in the abdomen. The frequency of breathing is in the range of 0.1 to 1 Hz. Body movement changes the liver orientation in the abdomen. The frequency of body movement is in the range of 0.01 to 10 Hz.

As mentioned previously the present perfusion loop comprises at least one device for holding or storing the liver outside of the body. Said storage device comprises at least one liver chamber assembly configured to hold an ex vivo liver, under desired conditions.

Said liver chamber assembly configured to hold an ex vivo liver, comprises at least one chamber; at least one liver support structure; optionally at least one layer of a biocompatible material to cover the liver and optionally at least one compression means for inducing compression on the perfused liver.

In one embodiment means for mechanically manipulating the liver provide a time dependent pressure, in particular a periodic pressure on at least a part of the perfused ex vivo liver. This is a deliberate compression of the liver. Furthermore, the location, the direction and/or the amount of the force for exerting the compression of the liver is time dependent, in particular periodic. With such an arrangement it is possible to generate complex and/or adaptive compression procedures.

The present liver chamber assembly is configured to hold a liver ex vivo, and comprises at least one chamber to guarantee sterility and control the desired inside conditions with respect to temperature, humidity, gas composition and pressure. Said chamber could be a closed box or a closed and flexible bag to protect the liver from environmental impact (temperature variations, unsterile air or fluid). The temperature in the chamber is controlled by a heating/cooling unit that is part of said liver chamber assembly. As heating/cooling unit, Peltier elements or a recirculation chiller can be used. Optionally, humidity in said chamber can be controlled between 50% to 100% by evaporating water inside the chamber in an evaporation unit. Also optionally, the chamber is air tight and has a gas supply that enables a desired gas composition inside the chamber. By this gas supply, also a slightly higher (mbar) pressure than atmospheric pressure can be adjusted inside the chamber to prevent air from entering the chamber in order to keep sterility. The chamber has several sealed ducts for lines (sensor lines, electricity, compressed air) and tubings connected to the liver or connected to inner parts of the liver chamber assembly. Said lines and tubing are e.g. hepatic artery, portal vein, vena cava, bile outflow, ascites outflow and so on.

The liver support structure as part of the present liver chamber assembly is needed to position, fix and finally store the live inside the chamber in a gentle and physiological manner. Said liver support structure could cover the whole surface of the liver or a certain part of the liver. There could be ducts passing through the support structure for the lines connected to the liver (hepatic artery, portal vein, vena cava, bile outflow) or additional supply lines e.g. for fluids. Additionally, lines for electrodes (electrical stimulation) connected to the surface of the liver or sensor and monitoring lines can also pass through the support structure. Moreover the support structure can keep sterility and collect the ascites fluids or fluid losses secreted form the surface of the liver.

The support structure can be out of solid or flexible material. A flexible material like cushion(s) filled with a fluid or gas, sponge like structure, a gel-like structure or a foil is able to adapt smoothly to the shape of the perfused liver and therefore enables a gentle storage of the liver during perfusion.

In yet a further embodiment of the present liver chamber assembly the at least one liver support structure is a preformed bed, in particular a preformed cushion filled with a liquid or gel or any other padding. A liquid liver support can also be envisioned. A predefined shape can be imposed by the shape of the cushion. The predefined shape can be made by classical manufacturing techniques, e.g. milling, or 3D printing.

The (optional) layer made of biocompatible material (also designated as inner layer) of the present liver chamber assembly is placed inside the support structure and this inner layer is in direct contact with the liver and should be therefore out of a biocompatible material. This inner layer could be a (semi)-permeable membrane or a foil (e.g. out of a polymer). This additional layer is beneficial to control temperature, humidity and keep sterility. Said inner layer could cover the whole surface of the liver or a certain part of the liver. There could be sealed ducts passing through the inner layer for the lines connected to the liver (hepatic artery, portal vein, vena cava, bile outflow). Additionally, lines for electrodes (electrical stimulation) connected to the surface of the liver or sensor and monitoring lines can also pass through (sealed) the inner layer. Moreover the inner layer can collect the ascites fluids or fluid losses secreted form the surface of the liver. This inner layer is out of a thin and flexible material to adapt smoothly to the shape of the perfused liver.

The (optional) compression means for the massage (compression and decompression) of the perfused liver is preferably realized inside the chamber by means of a technical solution. By providing said compression means the physiological liver movement during breathing and body movement can be mimicked.

Generally, the liver can be mechanically stimulated by forces acting on the surface of the liver. On the other hand, the liver can be electrically stimulated by electrodes placed on the surface of the liver. The forces for compression and decompression on the surface of the liver can be transferred by active and moving element acting on the liver surface. Such active elements can be deflateable and inflatable cushions, fluid jets impinging on the inner layer covering the liver, fingers who massage the liver, rollers who roll over the liver surface and so on.

In one embodiment the compression means may be realized by a system of deflateable and inflatable cushions. Here a fluid is sucked out and pumped in with a certain frequency (0.01 Hz to 10 Hz). The system of deflateable and inflatable cushions can consist of a single cushion or a system of several individually controllable cushions. Different compartments can be envisioned to distribute the load. During the inflation and deflation process of these cushions, forces are transferred to the surface of the liver that finally massage the liver according to the proposed protocol. Said cushion system also helps to position, fix and finally store the liver inside the chamber in a gentle and physiological manner. Said cushion system could cover the whole surface of the liver or a certain part of the liver. By covering the liver with impermeable sheets, cushions can completely envelop the liver, while discarded liquids, e.g. ascites, can still be collected. This arrangement most closely resembles the physiological position. There could be ducts passing through the cushion system for the lines connected to the liver (hepatic artery, portal vein, vena cava, bile outflow). Additionally, lines for electrodes (electrical stimulation) connected to the surface of the liver or sensor and monitoring lines can also pass through. Moreover the cushion system can keep sterility and collect the ascites fluids or fluid losses secreted form the surface of the liver. The cushion system is made of a flexible and thin material in order to adapted smoothly to the shape of the perfused liver. The padding material inside the cushions could be a fluid, a gas, gel or powder.

A further embodiment of the present compression means comprises at least one rotation mechanism. The liver is fixed and positioned inside the support structure and optionally, the liver is also put into the inner layer. This system is placed in a drum that has the capability to rotate at least around one axis. The direction of rotation can change alternatingly or the direction of rotation can also stay the same during the perfusion process. Rotation continuously changes liver position/orientation with respect to the direction of the gravitational forces acting on the liver. Therefore, the forces acting on the surface of the liver are continuously changing and enables the massage of the liver surface. By means of this setup, the liver is compressed and decompressed (massaged) by its own weight. Such a rotation could finally mimic a physiological liver movement. All lines, tubes and connections that are connected to the drum are equipped with special couplings that enable the rotation of the drum without twisting. The advantage of this system is that the weight of the liver is always lying on different surface areas of the liver. Therefore, the locations of pressure hotspot(s), where the liver tissue is compressed from the weight of the liver, are always changing their location on the liver surface.

As yet a further embodiment of the present compression means, a liquid liver support is provided. Here buoyant forces are used to store the liver inside a liquid. By this approach, the pressure distribution around the liver is comparably homogeneous and pressure hotspots can be avoided. The buoyancy forces needed to properly store and position the liver inside the liquid can be adapted by the density of this liquid itself (storage fluid). So, there is a box or bag (storage vessel) with the required stiffness and stability to store a certain volume of the proposed liquid (storage fluid). A heating, respectively cooling unit can be integrated into this storage vessel to control the temperature of said liquid fluid that acts as storage fluid for the liver. Such a storage fluid can be an aqueous salt solution, water, oil, glycerin or any other liquid. The liver is placed in the inner layer that covers the whole organ. This inner layer is finally closed and sealed to form a storage bag that is placed inside the storage vessel filled with storage fluid. Inside the storage vessel, the storage bag is held in place by a positioning device. This storage bag has to be tight that storage fluid cannot enter. There are sealed ducts passing through the inner layer respectively the storage bag for the lines connected to the liver (hepatic artery, portal vein, vena cava, bile outflow). Additionally, lines for electrodes (electrical stimulation) connected to the surface of the liver or sensor and monitoring lines can also pass through (sealed) the inner layer. Moreover the inner layer collects the ascites fluids or fluid losses secreted form the surface of the liver.

In order to enable (optionally) massage and movement of the liver, a system out of several nozzles surrounds the storage bag inside the storage vessel. Every nozzle of this multi-nozzle-system is individually controllable with respect to mass flow over time. Every nozzle can close an open individually. Storage fluid is fed (continuously) to the multi-nozzle-system by a pump (e.g. centrifugal pump) in order to have a slightly elevated pressure inside the multi-nozzle-system. By opening and closing nozzles individually, fluid jets impinge on the surface of the storage bag. This impingement results in a local massage, respectively deformation on the liver surface.

In yet a further embodiment a massage of the liver may be effected by pressure changes within a gas tight liver chamber. For example, a slight overpressure (or excess pressure) may be generated by means of a periodical injection of gas (air, nitrogen) into the gas tight chamber. When releasing part of the gas from the liver box (for example by means of a control valve) periodical pressure variations can be created in the box which in turn can promote a massage of the liver surface. This may be realized by 3/2 way valve wherein in a first position pressured air is fed into the chamber for a predetermined time period for generating the overpressure and in a second position of the valve a contact between chamber and outside environment is established for a predetermined time period. This process is repeated several times. The gas that is introduced into the chamber should be sterile.

Perfusion Media

The perfusion media used in the present perfusion loop is based on blood provided with additional infusions and an independent $O_2$, $CO_2$ and $N_2$ supply (as lung function).

In one aspect the additional infusions are selected from a group comprising bicarbonate, insulin, heparin, flolan, taurocholic acid, parenteral nutrition, potassium ions (K+), antibiotics and calcium gluconate.

Bicarbonate is a buffer solution which influences and maintains the pH of the perfusion media.

$CO_2$ dissociates in the perfusion media and also has an influence on the pH of the perfusion media. Bicarbonate solution is infused into the perfusion media by a syringe driver.

Bicarbonate infusion is in the range of 0 to 50 ml/h, more specifically 2 to 10 ml/h.

Insulin regulates metabolic liver activity. It was shown that insulin is the only hormone that the liver needs unconditionally. Insulin regulates the blood sugar level such that the blood sugar level goes down.

Heparin helps preventing the blood from clotting. It is however only effective in combination with protein antithrombin III. Heparin increases blood coagulation time and the activated clogging time (ACT) goes up.

Flolan (comprising sodium epoprostenolat as tissue hormone) acts as a vasodilator and protects the endothelial cells from damage.

Taurocholic acid is a bile acid or salt. Normally, 90% of bile acids are recirculated to liver through the digestive tract. Since in the present system this is not possible, bile acids (i.e. taurocholic acid) are substituted such that the liver does not have to produce all acids. By adding taurocholic acid the bile production is maintained.

Parenteral nutrition contains nutrients such as glucose, amino acids, lipids and electrolytes. It provides nutrition for the liver and a glucose increase.

Potassium-ions play an important role in cell metabolism and osmolality. By adding potassium ions the $K^+$ concentration is kept at physiological levels.

The infusions are added to the perfusion media in the present perfusion loop in accordance to the following infusion protocol. There is a bolus injection of antibiotics, calcium gluconate (5 to 15 ml, preferably 10 ml of 10% calcium gluconate solution) and $NaHCO_3$ (10 to 20 ml, preferably 15 ml of sodium-bicarbonate 8.4% (1 mmol/ml)). Subsequently the further additional compounds are provided with a constant infusion rate: insulin (1 ml/h), heparin (2.5 ml/h), flolan (1 ml/h), taurocholic acid (3.5 ml/h), $NaHCO_3$ (2 ml/h) and K+ (2 ml/h). The parenteral nutrition is started when the glucose level reaches about 200 mg/dl in the artery branch.

As mentioned above $CO_2$, $O_2$ and $N_2$ are provided as independent gas supply. $CO_2$ influences $pCO_2$ in blood and consequently pH. The supply of $CO_2$ compensates for low liver metabolism. The addition of $O_2$ influences $pO_2$ in blood and consequently oxygen saturation. $N_2$ serves as filler gas and enables to maintain a constant gas flow rate in the oxygenator.

$O_2$, $CO_2$ and $N_2$ gas supply to the oxygenator can be regulated independently. Gas supply is measured and regulated by a gas flow meter. The $O_2$ gas flow is in the range of 0 to 5 l/min, more specifically 300 to 800 ml/min. The $CO_2$ gas flow is in the range of 0 to 1000 ml/min, more specifically 0 to 50 ml/min. Carbon dioxide partial pressure of the perfusion media is directly influenced by the $CO_2$ gas supply. Furthermore, pH of the perfusion media is influenced by the $CO_2$ gas supply. The $N_2$ gas flow is in the range of 0 to 5 l/min, more specifically 300-800 ml/min. Oxygen partial pressure and oxygen saturation of the perfusion media (e.g. blood) is directly influenced by the $O_2$ gas supply. Nitrogen can be used as a filler gas if a constant total gas flow rate to the oxygenator should be maintained. The initial gas supply may be done according to the following protocol: $CO_2$ 50 ml/min flow rate, $O_2$ 750 ml/min flow rate and $N_2$ 0 ml/min. Later on the following protocol might be used: $CO_2$ 0 ml/min flow rate, $O_2$ 400 ml/min flow rate and $N_2$ 400 ml/min.

The pH, oxygen partial pressure, oxygen saturation and carbon dioxide partial pressure of the perfusion media can be measured by blood gas analysis or a continuous blood gas monitoring system.

A control system may be established which controls pH, oxygen partial pressure, oxygen saturation and carbon dioxide partial pressure of the perfusion media based on fixed setpoints by adjusting the bicarbonate infusion and different gas flow rates. Fixed pH, oxygen partial pressure, oxygen saturation and carbon dioxide partial pressure of the perfusion media can be maintained throughout the perfusion duration.

The embodiments are explained in more detail by means of several examples with reference to the figures. It shows:

DESCRIPTION OF THE INVENTION

Figure 1A:
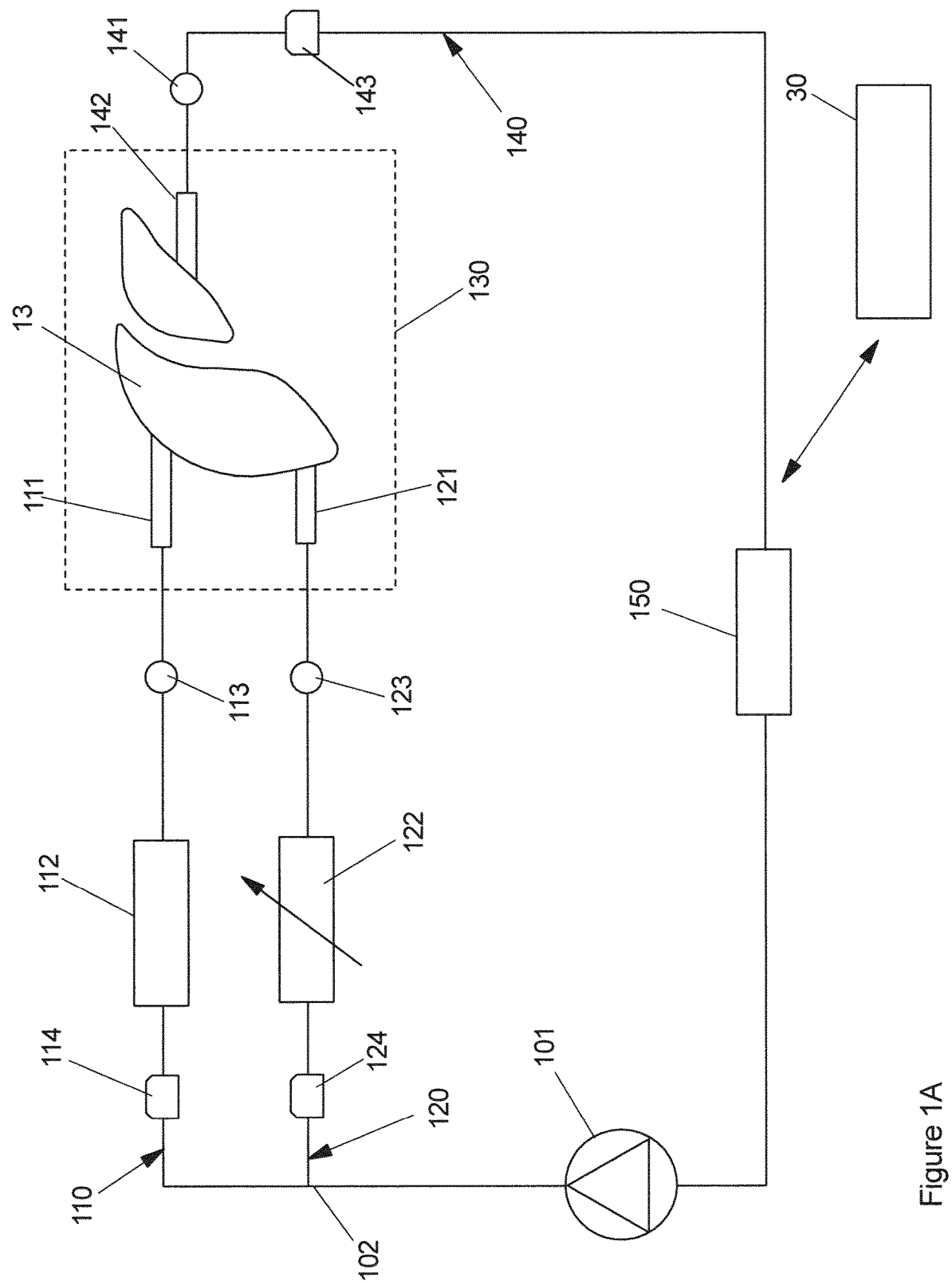
FIG. 1a a first embodiment of a perfusion loop assembly.

FIG. 1 a shows a first embodiment of the perfusion loop assembly comprising a pump 101 for keeping the perfusion medium flowing. Downstream from the pump 101 the line branches into a first branch line 110 and second branch line 120. The branching point 102 (e.g. a divider) can be a mechanical device or a split in the line coming from the pump.

The first branch line 110 provides a first portion of the perfusion fluid to the hepatic artery (arteria hepatica propria or arteria hepatica communis) 111 of the liver which is here housed in a liver chamber assembly 130.

Here a gas exchanger 112, an oxygenator is arranged solely in the first branch line 110, i.e. hepatic artery branch. A flow sensor 114 is here measuring the fluid flow in the first branch line 110 upstream from the gas exchanger 112.

The second branch line 120 is configured to provide a second portion of the perfusion fluid to the portal vein (vena portae hepatis) 121 of the liver in the liver chamber assembly 130. The second branch line 120 is also comprising at least one valve 122 for controlling the flow of the perfusion fluid into the portal vein 121 of the liver in the liver chamber assembly 130.

The valve 122 is here a proportional pinch valve (Resolution Air, MPPV-8) to adjust the flow into the portal vein 121. The proportional pinch valve 122 can be varied from fully open to almost or fully closed (up to a flow rate of 2.0 l/min in the portal vein 121). Upstream from the valve 122 a flow rate sensor 124 measures the perfusion medium flow in the second branch line 120.

Pressure sensors 113, 123 measure the fluid pressure under ex vivo perfusion conditions in first branch line 110 (the hepatic artery 111 branch) and the second branch line (the portal vein 121 branch). The pressure sensors 113, 123 can be located in or close to the cannulation (not shown here) of the hepatic artery 111 and/or the portal vein 121.

Different embodiments of the liver chamber 130 will be described below.

The perfusion medium is collected through the liver outlet line 140 attached to the vena cava (vena cava inferior) 142 of the liver. A pressure sensor 141 measures the pressure under perfusion circulation, which can be located in or close to the cannulation (not shown here) of the vena cava inferior 142.

The outflow of the liver chamber assembly 130, i.e. the output of the vena cava 142 is directed to a reservoir 150 connected to the liver outlet line 140 and upstream from the pump 101. Therefore it is possible to generate a closed perfusion loop. It is possible to have additional flow lines into the system (e.g. to make up for fluid losses) and out of the system (e.g. as purge streams).

The connections of the lines 110, 120, 140 to the respective blood vessels 111, 121, 142 (hepatic artery, portal vein, vena cava) are made through cannulation, i.e. the ends of the lines 110, 120, 140 are constricted and inserted into the blood vessels 111, 121, 142. The cannulation is sealed by using surgical suture.

For the hepatic artery 111 liver inlet branch, 3/16" (0.00476 m, inner diameter) or 1/4" tubes are used. For the portal vein 121 liver inlet branch, 1/4" (0.00635 m, inner diameter) or 3/8" tubes are used. For the remaining tubes of the perfusion loop, 3/8" (0.00952 m, inner diameter) or 1/2" tubes are used. Different sized connectors are used to connect the individual branches of the loop.

The (reservoir 150 is attached to the vena cava 142 liver outlet branch line 140 and can impose atmospheric pressure on the enclosed perfusion medium. The reservoir 150 is attached at roughly the same height as the liver storage chamber, with an adjustable height setting (+/−50 cm). This can be adjusted (not shown here) by mechanical means to control the liquid head at the outlet of the liver (vena cava).

All tubings are kept as short as possible in order to minimize foreign surfaces. Moreover, the number of bendings and connectors in the perfusion loop should be minimized. Flow transition from laminar to turbulent in the perfusion loop should be avoided (acceleration and deceleration) to minimize hemolysis. The individual tube section lengths are in the range of 5 to 100 cm.

The length of the lines in the perfusion loop should be kept to a minimum in order to minimize the external surface in contact with the perfusion media.

The reservoir 150 (Eurosets, Variable Venous Reservoir 1800) is added after the inferior vena cava 142 in order to have atmospheric pressure (reference pressure). A pump 101 (Thoratec, Centrimag) with almost linear pressure-flow characteristics was used to circulate the perfusion fluid.

Flow rate sensors 114, 124, 143 (Sonotec, sonoflow CO0.56) and pressure sensors 113, 123, 141 (Edwards Lifesciences, TrueWave) are integrated in the perfusion loop. The perfusion medium flow rates and pressures are measured in all liver line branches 110, 120, 140 (hepatic artery, portal vein, vena cava).

The control of the perfusion loop assembly is effected by a control system 30 which is only shown schematically in FIG. 1 a. The control system 30 can be connected or coupled with relevant measurement points (e.g. pressure, flow rate, composition, optical measurement) and the relevant control elements (e.g. valves, pump motor, medication dosing, fluid head adjustment through reservoir 150 position). Measurement variables and manipulated variables will be described below.

The embodiment shown in FIG. 1a is an example of a perfusion loop assembly. Other embodiments might have e.g. a different arrangement of sensors, additional lines and other units as will be shown in connection with FIGS. 2 to 5 below.

Figure 1B:
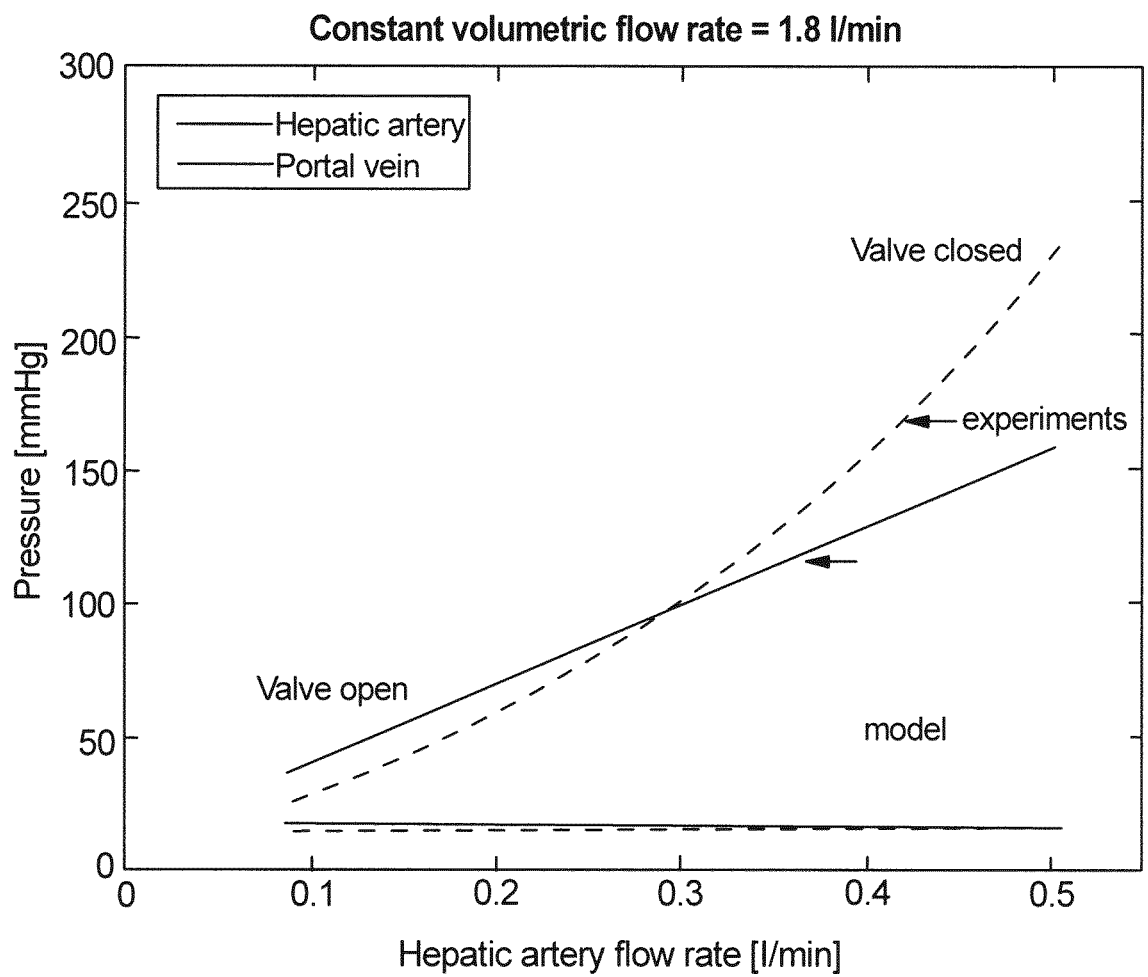
FIG. 1b a diagram showing the simulated and measured performance of the perfusion loop assembly of FIG. 1.

A numerical hydraulic analogy model verifies the flow characteristics of the perfusion loop. The liver is simulated by a constant pressure drop. An experimental validation of the numerical model was carried out by simulating the liver pressure drop by adjustable gate clamps. Results are shown in the diagram of FIG. 1b and explained in detail further below.

By progressively closing the proportional pinch valve 122, it could be shown, that a constant total flow rate in the system could be maintained. The pressure in the hepatic artery inlet branch 110 could be varied over a large range by progressively closing the proportional pinch valve and increasing the flow rate through this branch 110, thus reaching physiological values.

The pressure in the portal vein inlet branch 120 always remained in physiological ranges, even while the flow rate decreased through this branch 120. The numerical and experimental results fit reasonably well.

When closing the pinch valve 122, the overall resistance in the hydraulic circuit increases and as a consequence, the pump has to provide more power by increasing its rotation speed.

The pressure in the system (i.e. the perfusion loop assembly) ranges from −300 mmHg to 300 mmHg with respect to atmospheric pressure. The pressure differences in the system are overcome by the pump, with the lowest pressure of the system at the pump inlet and the highest pressure of the system at the pump outlet.

The temperature of the perfusion medium is controlled by the built in heat exchanger of the oxygenator which is connected to an external recirculation chiller (not shown in FIG. 1a). The perfusion loop assembly is optimized to provide normothermic perfusion, which is at 37° C. for humans. In principle the temperature range of the fluid in the perfusion fluid device is between 2° and normothermic conditions. The temperature is e.g. controlled through the chiller.

An insulation layer around the reservoir 150 or heating of the reservoir 150 may help to compensate for heat losses within the perfusion loop assembly, mostly originating from the exposed tubes.

The experimental validation of the model was done and the results are shown in the diagram of FIG. 1b. A constant flow rate of 1.8 l/min was adjusted using a controller for the pump 101. Water was used as a flow medium at room temperature (density $p=10000$ kg/m$^3$ and dynamic viscosity $\mu=0.001$ Pas). The flows in the hepatic artery 111 (Sonotec, sonoflow CO.55, 3/16"), portal vein 121 (Sonotec, sonoflow CO.56, 1/4") and vena cava 142 (Em-tec, 3/16") were recorded with ultrasonic sensors. A pressure monitoring set (Edwards Lifesciences, TrueWave (3 cc)/12 in (30 cm)) was used to measure the individual pressures. In order to calibrate the resistance of the liver through the hepatic artery 111 and portal vein 121 (adjustable gate clamps), the following steps were performed to reach conditions with the proportional pinch control valve 122 fully open:

1. Fully close the hepatic artery and adjust the flow rate to 1.5 l/min.
2. Tune the clamp (resistance of the liver) on the hepatic artery side until a pressure drop (p1-p3) of 88.5 mmHg is reached.
3. Open up the hepatic artery, fully close the portal vein and adjust the flow rate to 0.3 l/min.
4. Tune the clamp (resistance of the liver) on the portal vein side until a pressure drop (p2-p3) of 6 mmHg is reached.

The numerical results of the model (solid line) as well as the experimental validation (dashed line) are shown in the diagram of FIG. 1b. For both cases, the pinch valve on the portal vein side was first fully opened and then closed until a flow rate of 0.5 l/min was obtained in the hepatic artery.

The model predicts the pressure in the portal vein 121 very well for the entire flow range. However, there is a non-linear behavior during the experiment, contrary to the theoretical assumptions and expectations. The pressure drop in the hepatic artery 111 started to deviate from the model as the flow rate increased and the experimental validations showed higher differences. This could be explained due to the tighter closed clamp in the hepatic artery 111, which promotes turbulences at higher discharges, resulting in an increased pressure drop.

An advantage of the described embodiment of the perfusion loop assembly is that there is always a positive pressure at the outlet of the vena cava 142 due to the reservoir 150. There is the possibility that the pressure becomes slightly negative for a short period.

The reservoir has to be placed very close to the exit of the liver in order not to have an overpressure in the vena cava 142. Care must be taken as the height relative to the liver of the reservoir 150 has a very narrow range since the liver outlet is very sensible in terms of over- and underpressure with respect to atmospheric pressure.

Two further experiments were performed on the same setup with a higher (2.5 l/min) and lower (1 l/min) flow rate. The main result is that the flow rate in the portal vein can be regulated by changing the pump speed and adapting the position of the pinch valve. For example, if the same pressure and flow conditions at the hepatic artery shall be reached (e.g. a specific point in FIG. 1b), but a lower flow rate is desired through the portal vein, then the pumping speed must be decreased and the pinch valve has to be closed further. The opposite procedure has to be applied when a higher flow rate through the portal vein is desired. In this case, the pump has to deliver more flow (increase the power) and the pinch valve has to be opened in order to lower the pressure and decrease the flow in front of the hepatic artery.

The impact of the hepatic artery, oxygenator and pinch valve resistances (derived from the hydraulic analogy model) are very high. These components have the greatest influence on the perfusion loop and generate the highest pressure drops in the system. Therefore, it is also expected that they have a major effect on hemolysis.

Figure 2:
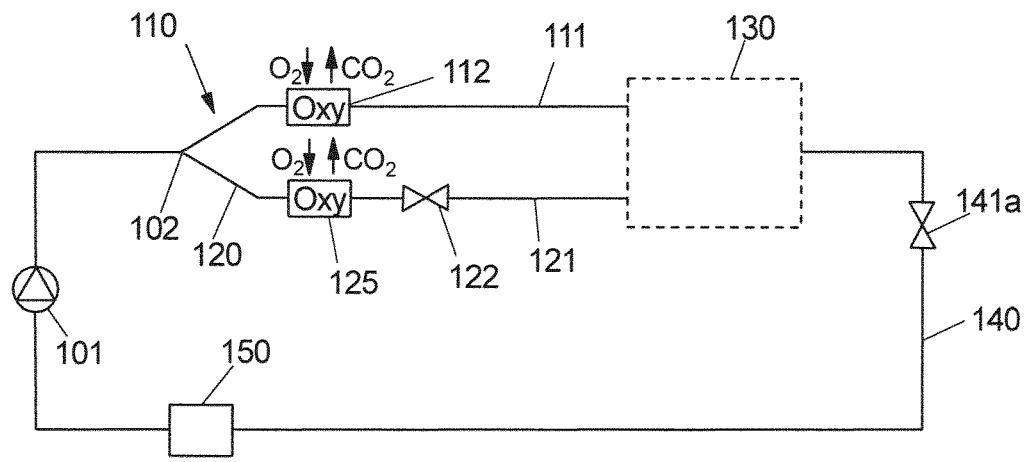
FIG. 2 a second embodiment of a perfusion loop assembly.

FIG. 2 shows a second embodiment of the perfusion loop assembly wherein in addition to the first embodiment shown in FIG. 1a a second oxygenator 125 is provided in the second branch line 120 (portal vein branch) downstream of the pump 101 and the flow divider 102 and upstream of the pinch valve 122. Pressure and flow rate are measured downstream of the flow divider.

For reasons of clarity some details shown in FIG. 1a are not depicted in FIG. 2, but the basic functionality is the same so that reference can be made to the embodiment of FIG. 1a.

In addition to the setup shown in FIG. 1a a further pinch valve 141a is arranged downstream of the vena cava outlet 142 in the vena cava outlet line 140. The pinch valve 141a allows to adjust the pressure at the vena cava outlet such that physiological pressure values resp. variations are generated in the vena cava as created e.g. by breathing. For example, during one breath sequence the pressure in the vena cava varies between +15 and −10 mmHg when inhaling and exhaling. However, it is also possible to keep the pressure in the vena cava constant on the physiological level when using the pinch valve.

Figure 3:
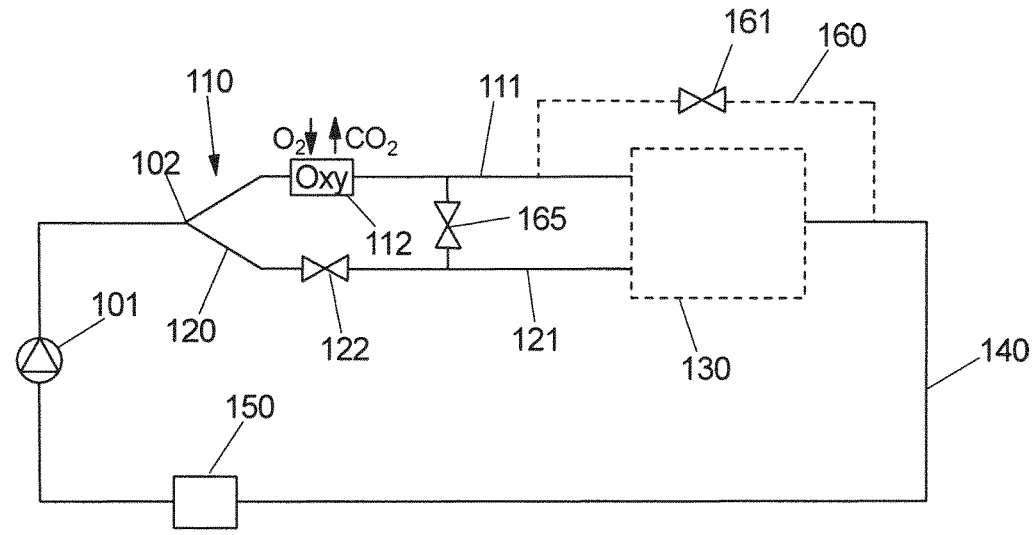
FIG. 3 a third embodiment of a perfusion loop assembly.

FIG. 3 shows a third embodiment of the perfusion loop wherein in addition to the first embodiment of FIG. 1a a bypass 160 (with a valve 161) is provided from the first branch line 111 (hepatic artery branch) to the branch line to the vena cava 142. Therefore, the liver chamber assembly 130 is bypassed by this line. Said bypass 160 will have no influence on the above described perfusion loop assembly, besides a higher flow rate through the pump 101.

Figure 10:
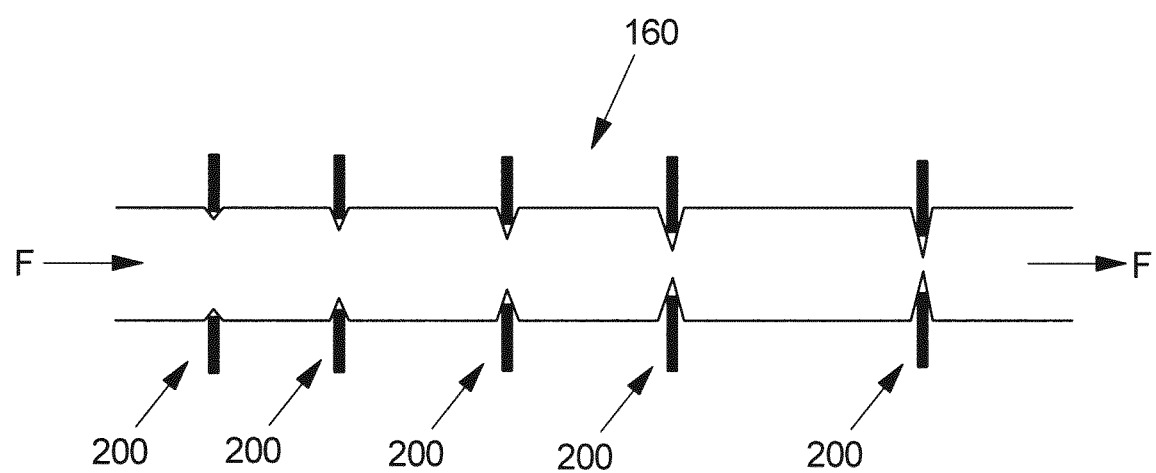
FIG. 10 a schematic cross-sectional view of a bypass with constrictions.

The pressure drop over the bypass 160 can be accomplished over one or multiple stages, which are each made up of individual constrictions 200 not shown here, but in FIG. 10. Multiple constrictions allow a more gentle pressure expansion which minimizes hemolytic contributions in the perfusion system by minimizing pressure gradients in the perfusion medium. The proportional pinch valve 161 controls the flow rate through the bypass 160 based on the oxygen saturation in the perfusion medium. The bypass 160 allows for obtaining physiological oxygenation the (second) portal vein branch line 120 (90-100% oxygen saturation) and portal vein 121 (70-80% oxygen saturation). For reasons of clarity other units shown in FIG. 1a are not depicted in FIG. 3, but the basic functionality is the same so that reference can be made to the embodiment of FIG. 1a.

Figure 4:
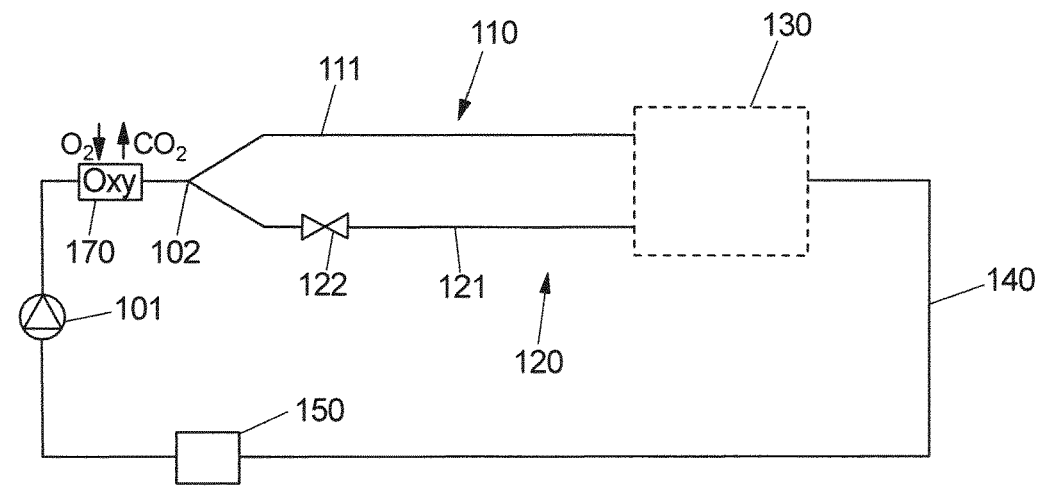
FIG. 4 a fourth embodiment of a perfusion loop assembly

In another embodiment the flowsheet would be like in FIG. 3 only that the bypass 165 would be between the first branch line 110 an the second branch line 120, The embodiment of the perfusion loop illustrated in FIG. 4 differs from the embodiment in FIG. 1a in that an oxygenator 170 is located in front or upstream of the divider 102 that splits the perfusion loop into the first branch line 110 (hepatic artery branch) and second branch line 120 (portal vein branch). In this case only one oxygenator 170 is used to oxidize both liver branch lines 111, 121. This means that there is less foreign surface in the perfusion loop (oxygenators have very large foreign surfaces due to the membrane oxygenation) what in turn causes fewer hemolytic contributors in the perfusion loop. For reasons of clarity other units shown in FIG. 1a are not depicted in FIG. 4, but the basic functionality is the same so that reference can be made to the embodiment of FIG. 1a.

Figure 5:
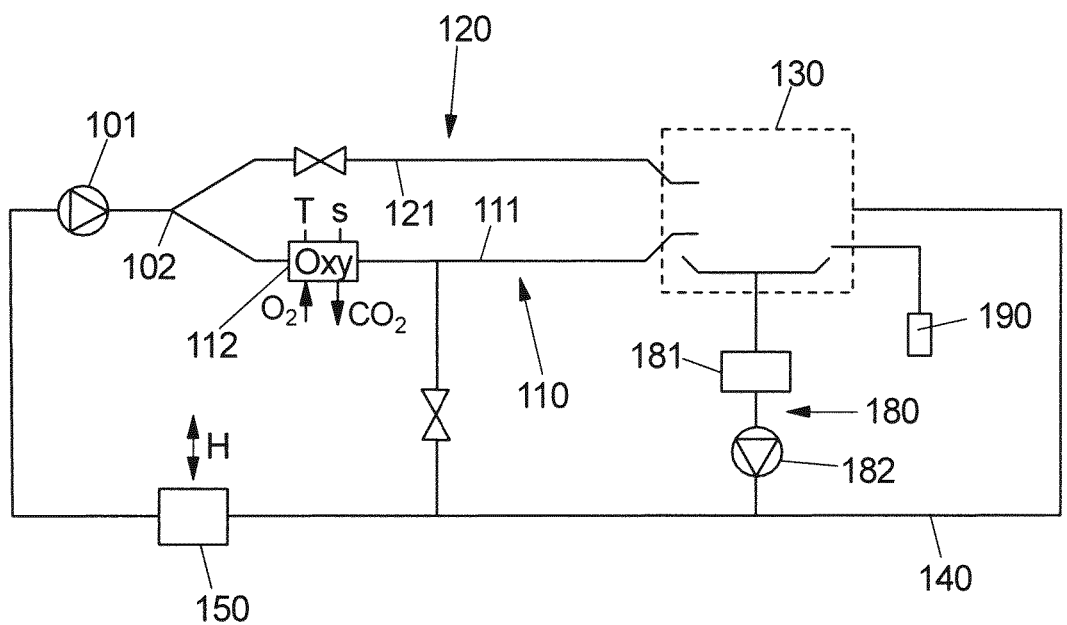
FIG. 5 a fifth embodiment of a perfusion loop assembly.

The embodiment of FIG. 5 is a variation of the embodiment shown in FIG. 3 with the additional features of a bypass 180 or branch passing from the liver chamber assembly 130 via a pump 182 to the vena cava branch 140 for collecting ascites from the liver surface. The ascites are collected in a reservoir 181 and may be guided through a dialysis machine (not shown) for removing toxins and urea so that the ascites can be circulated back into the perfusion loop.

A further additional feature (which can be alternatively used with any embodiment) is the constant measurement or monitoring of bile 190 production.

For this purpose a suitable device (such as a spectrophotometer) is connected to the liver and the liver flow is captured and monitored. The color of human bile 190 (i.e. liver bile) is representative of the properties. Deviation e.g. from the normal golden-yellow or light-brown color can indicate a deviation of the function of the perfused liver in the liver chamber assembly 130. This deviation can be used in a control loop (not shown here) to adjust e.g. the rate of the pump 101 and/or the gas exchange or given infusions and medications. In addition or alternative to the color, physical properties (e.g. viscosity), the composition of the bile and/or the pH value can be monitored or used in a control loop.

Another measureable parameter which can be used alone or in combination with other is hemoglobin (or another blood related value) in the bile. If that value increase above a certain threshold, it might be an indication that the ex vivo liver is not performing.

Figure 6:
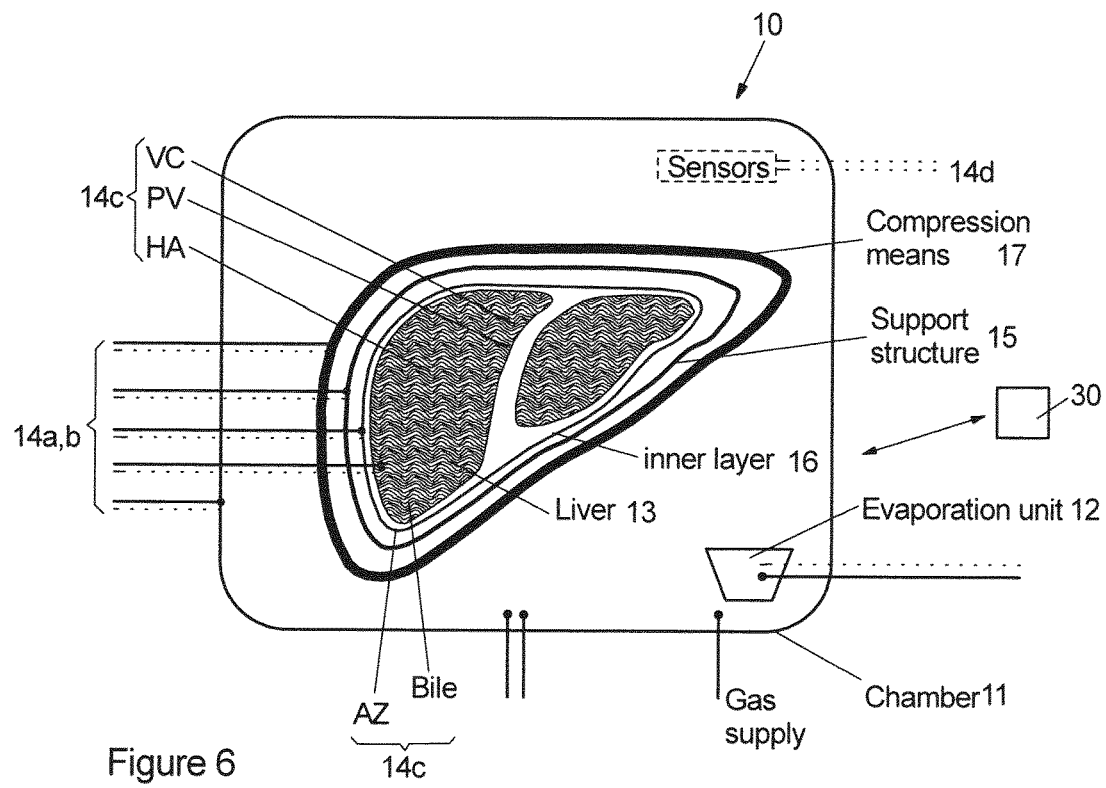
FIG. 6 a sectional cut through a first embodiment of a liver chamber assembly.

FIG. 6 shows a schematic, sectional cut through of an embodiment of the present liver chamber assembly 10 illustrating the principle features thereof. The chamber 11 can be a rigid box or a more flexible bag and is configured to hold the liver 13. The chamber 11 is designed to keep sterility and control the desired inside conditions for the liver perfusion process (such as temperature, humidity, gas composition, pressure). The humidity within the chamber 11 may be adjusted using an evaporation unit 12. The chamber 11 has several sealed ducts for electric lines 14a, tubings 14b for fluids, lines 14c for hepatic artery (HA), portal vein (PV), vena cava (VC), bile outflow, ascites (AZ) outflow and sensor lines 14d connected to the liver 13 or connected to inner parts of the liver chamber assembly 10. Ascites and bile are continuously removed from the liver 13 and monitored. The data can be used in the control of the perfusion loop assembly (e.g. embodiments shown in FIGS. 1a, 2, 3, 4, and 5) and/or the liver chamber assembly 10.

The liver 13 is positioned on a liver support structure 15 that fixes and stores the liver 13. The support structure 15 may comprise a flexible material such as a cushion filled with a fluid. Lines and tubing 14a-c pass through the support structure 15. Alternatively the support structure 15 can comprise a plastic sheet material, a membrane and/or a set of rigid elements which can be individually moved.

An inner layer 16 made of a biocompatible material (e.g. membrane or foil) is placed around the liver 13 to keep sterility, humidity, temperature and collect the ascites fluids or fluid losses secreted from the surface of the liver 13. Lines for electrodes (e.g. for electrical stimulation) connected to the surface of the liver 13 or sensor and monitoring lines 14d can also pass through (sealed) the inner layer 16.

Compression means 17 is for inducing compression and decompression (respectively some kind of massage) of the perfused liver 13. This can be made to mimic the physiological liver motion. The liver 13 can be mechanically and/or electrically stimulated.

Figure 7:
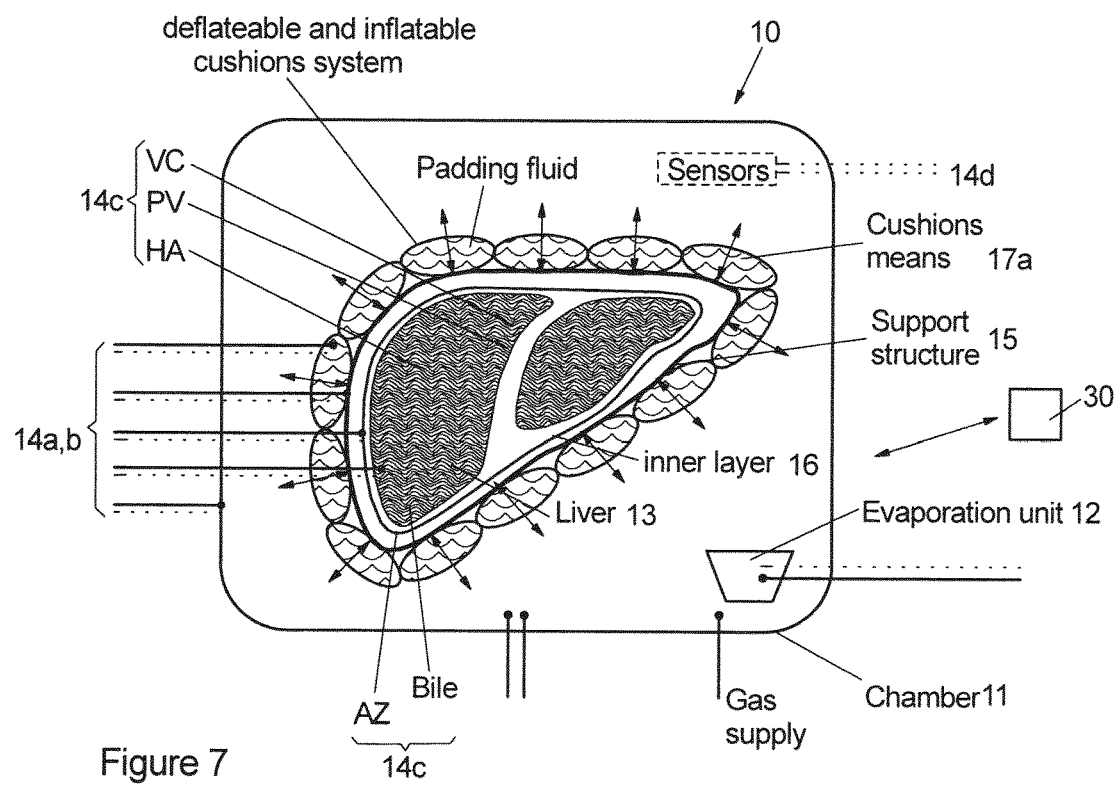
FIG. 7 a first embodiment of a compression means.
Figure 8:
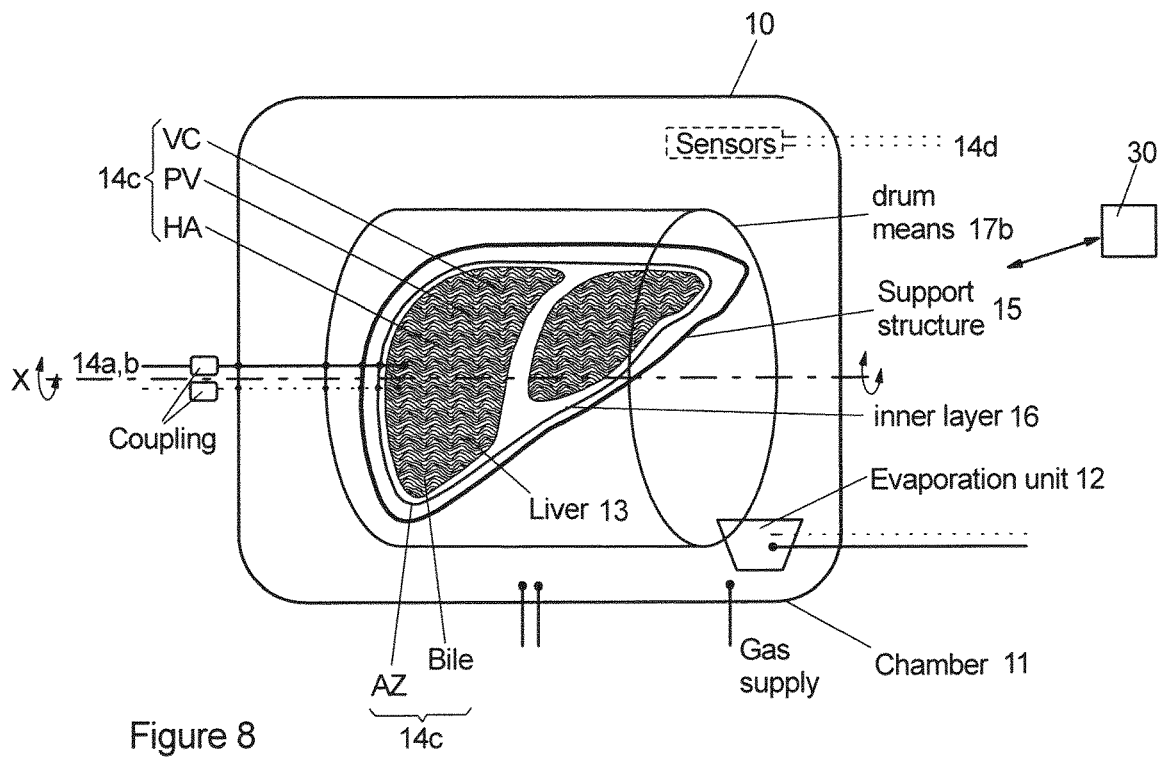
FIG. 8 a second embodiment of a compression means.
Figure 9:
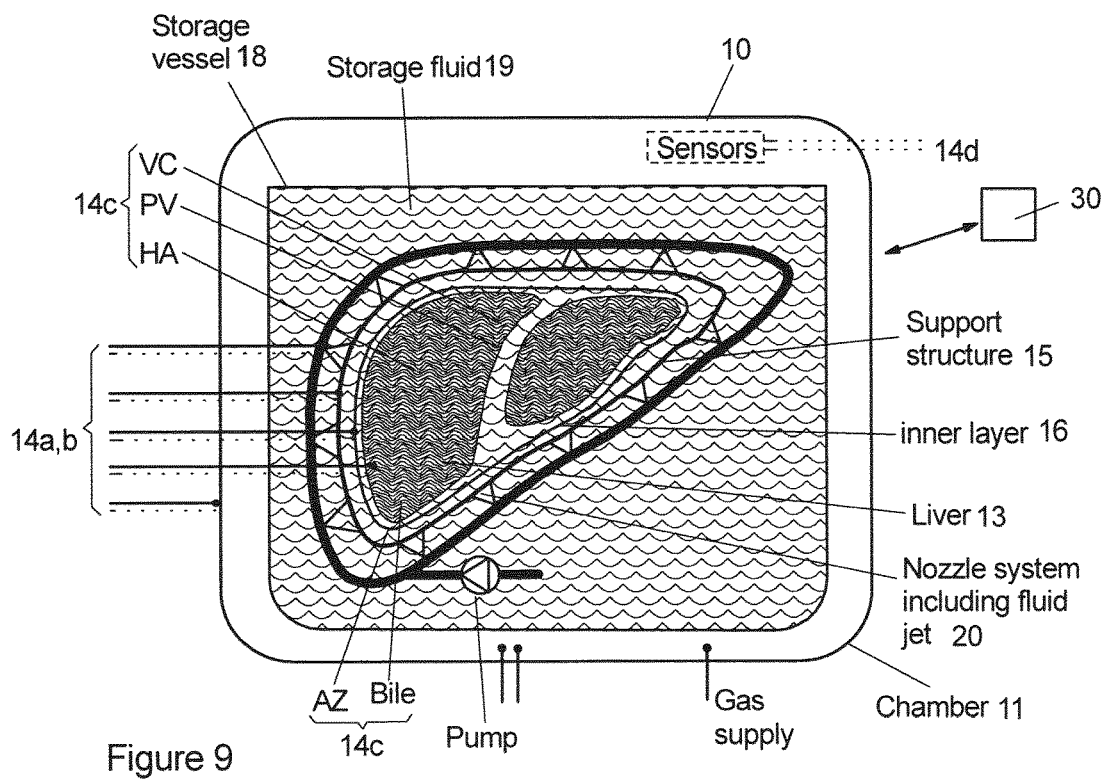
FIG. 9 a third embodiment of a compression means.

Different embodiments of compression means 17 are illustrated in FIGS. 7 to 9, respectively. Since the basic functionality is described in FIG. 6, reference can be made to that description. Compression in this context means e.g. any kind of pressure exacted onto the surface of the liver 13 or a part of the surface of the liver 13 which is different from the mere pressure on the liver, in particular on the non-moving (stationary) liver, by gravitational force. A compression can be performed by moving a liver periodically against a rigid part (in particular stiffer than the liver tissue), such as a plate. In this case, the direction of the acting, periodic force would be the sum of the weight force and the pressing force against the rigid part. This would be one embodiment of a dynamic compression force.

In another embodiment of a dynamic compression the direction of the pressure (i.e. the force distributed over a certain area of the liver surface) would generally deviate from the direction of the gravitational force, i.e. the direction of the pressure on the liver 13 under its own weight. It should be noted that this dynamic compression would be something like a massage. That means that different parts of the liver surface are subjected to different pressures (i.e. the location, the amount of the applied force and/or the direction direction) at different times. This could also include the some movement of the force over the liver surface, like in a stroking movement.

This would also enable compression patterns which are different from the physiological pressure regime.

The dynamic compression would e.g. allow the directed increase of perfusion in certain parts of the liver. This could e.g. be effected or enhanced by an electrostimulation. It is also possible that the compression, in particular the dynamic compression can be controlled in dependence of the color of the liver surface. An imaging system could detect discolorations in the liver surface and change the compression, in particular the directional dynamics compression in those areas. In another embodiment, a control system 30 (e.g. a computer, a microprocessor) of the compression means 17 (shown schematically in FIGS. 7 to 9) would take those measurements and adjust the actors of the compression means 17 (e.g. cushions 17a, drum 17b, nozzles 20) according to the measurements.

The first embodiment of a compression means 17 shown in FIG. 7 comprises multiple deflateable and inflatable cushions 17a that are separately controllable. The cushions 17a are made of a flexible and thin material. The cushions 17a are placed around the liver 13 and help to position and fix the liver 13. The deflation and inflation process is controlled by pumping a fluid into the cushions 17a and out of the cushions 17a with certain frequency (for example 0.5 Hz). By doing so the liver 13 is massaged according to a provided protocol. Lines and tubing 14a-c connected to the liver 13 pass through the cushions 17a. Additionally, lines for electrodes (electrical stimulation) connected to the surface of the liver 13 or sensor and monitoring lines 14d can also pass through.

The second embodiment of a compression means shown in FIG. 8 comprises a rotation mechanism in form of a drum 17b filled optionally with a suitable fluid (e.g. isotonic water, Ringer solution). Here the liver 13 is fixed and positioned inside the support structure 15 and optionally covered by the inner layer 16. This system is placed in the drum 17b. The drum 17b rotates around the axis X. The direction of rotation changes in an alternating manner or stays the same. The rotation continuously changes liver 13 position/orientation with respect to the direction of the gravitational forces acting on the liver 13. Therefore, the forces acting on the surface of the liver 13 are continuously changing that enables the massage of the liver 13 surface over time. The liver 13 is compressed and decompressed (massaged) by its own weight.

The third embodiment of the compression means shown in FIG. 9 comprises the storage of the liver 13 in a storage vessel 18 filled with a storage fluid 19. The storage vessel 18 is made of a box or bag with the required stiffness and stability to store a certain volume of the storage fluid 19. The storage fluid 19 may be an aqueous salt solution, water, oil, glycerin or any other liquid.

The liver 13 is placed in the inner layer 16 that covers the whole liver 13 and optionally also in the support structure 15. This inner layer is finally closed and sealed to form a storage bag that is placed inside the storage vessel 18 filled with storage fluid 19.

Inside the storage vessel 18, said bag is hold in place by a positioning device. This storage bag has to be tight that storage fluid cannot enter. Lines and tubing 14a-c pass through the inner layer 16, and optionally also through the support structure 15

Several nozzles 20 surround the storage bag (inner layer 16) respectively optionally the support structure 15 to massage and move the liver 13. Every nozzle 20 is controlled individually with respect to mass flow over time. Storage fluid 19 is fed to the multi-nozzle-system by a pump (e.g. centrifugal pump) in order to have an elevated pressure inside the multi-nozzle-system. By opening and closing nozzles individually, fluid jets impinge on the surface of the storage bag respectively optionally on the surface of the support structure 15. This impingement results in a local massage respectively deformation on the liver surface.

The compression means and the details for operating the compression means, as described above in the context of FIGS. 7 to 9, in particular the dynamic compression with a time-pendent direction of the compression force, can be used with all embodiments described above.

In the following some more details of the control system 30 of the perfusion loop assembly (schematically shown in FIG. 1a) and the liver chamber assembly 130 are given.

Typical measurement signals comprise the flow rates, pressures, temperatures, humidity, ascites data (e.g. flow rate), bile data (e.g. flow rate, composition), pump speed and valve position (e.g. proportional pinch valve position) and parameters of liver tissue and blood analysis. The signal processing units transmit their data e.g. to an embedded microprocessor. Signals from blood gas analysis and/or chemical analysis can also be transmitted to the microprocessor.

The microprocessor of the control system 30 can e.g. control the perfusion loop assembly by manipulating the following items:

flow and/or pressure in first branch line 110 (hepatic artery)

flow and/or pressure in the second branch line 120 (portal vein)

flow rate through one bypass (e.g. bypass 160 from hepatic artery 111 to vena cava 142)
pressure in the vena cava 142
temperature of the perfusion medium
humidity in the liver chamber assembly 130
gas supply to a gas exchanger, e.g. oxygenator 112, 125, 170
return of ascites liquid
dosing of at least one medication With these controlled and manipulated variables an automatic control of the perfusion loop assembly and/or the liver chamber assembly 130 can be performed. Setpoints could be changed any time.

The input and output data can be visualized dynamically to monitor the progress. The data is recorded within the control system. Since this involves potentially sensitive medical data, the data is encrypted. The data processing can be performed centrally for a distributed network of perfusion loop assemblies and/or liver chamber assemblies.

In FIG. 10 a schematic view of a bypass, as e.g. used in the embodiment shown in FIG. 3 is shown. The perfusion fluid F flows from left to right, passing through five constrictions 200, i.e. means for lowering the cross-section of the bypass. The constrictions 200 can be manually or automatically changed to control the pressure expansion in the bypass.

REFERENCE NUMBERS

11 chamber of liver chamber assembly
12 evaporation unit
13 liver
14a electric lines
14b tubings for fluid
14c lines for blood vessels (hepatic artery, portal vein, vena cava), bile, ascites
14d sensor lines
15 liver support structure
16 inner layer
17 compression means
17a cushions
17b drum
18 storage vessel
19 storage fluid
20 nozzle
30 control system
101 pump
102 flow divider
110 first branch line (hepatic artery)
111 hepatic artery vessel
112 first oxygenator, gas exchanger
113 first pressure sensor
114 first flow rate sensor
120 second branch line (portal vein)
121 portal vein vessel
122 first valve
123 second pressure sensor
124 second flow rate sensor
125 second oxygenator, gas exchanger
10, 130 liver chamber assembly
140 outlet line
141 third pressure sensor
141a vena cava pinch valve
142 vena cava vessel
143 third flow rate sensor
150 reservoir
160 bypass from hepatic artery branch to vena cava branch
161 fourth valve
170 third oxygenator, gas exchanger
180 bypass for ascites
181 reservoir
182 ascites pump
200 constriction

The invention claimed is:

1. A perfusion loop assembly for an ex vivo liver perfusion comprising:
   only one pump for providing a flow of a perfusion liquid through a first branch line and a second branch line, wherein the perfusion flow is split downstream of the one pump into the first branch line and the second branch line at a branching point;
   the first branch line being configured to provide a first portion of the perfusion liquid to the hepatic artery of the liver, wherein at least one gas exchanger is arranged in the first branch line downstream of the branching point;
   the second branch line being configured to provide a second portion of the perfusion liquid to the portal vein of the liver, the second branch line further comprising at least one first valve for controlling the flow of the perfusion liquid into the portal vein of the liver;
   a liver chamber assembly configured to hold the liver ex vivo;
   a liver outlet line attached to the vena cava of the ex vivo liver, wherein the liver outlet line comprises at least one valve; and
   at least one reservoir connected to the liver outlet line and upstream from the one pump,
   wherein the first branch line, the second branch line and/or the liver outlet line comprise an interface configured to be inserted into the hepatic artery of the liver, the portal vein and/or the vena cava respectively;
   wherein the first branch line, the second branch line and/or liver outlet line comprise at least one flow rate sensor and/or at least one pressure sensor;
   wherein a bypass with a valve is established between the first branch line and the second branch line, wherein the valve of said bypass is operative for controlling a flow of the perfusion liquid between the first branch line and the second branch line; and
   wherein a flow throttling in the at least one first valve of the second branch line, in the valve in the bypass, and in the valve in the liver outlet line is accomplished over one or multiple stages, wherein each of the one or multiple stages includes a manually adjustable constriction, an automatically adjustable constriction, or both a manually and an automatically adjustable constriction.

2. The perfusion loop assembly according to claim 1, further comprising:
   at least one third gas exchanger downstream of the one pump; and
   downstream from the at least one third gas exchanger the perfusion liquid flow being split into the first branch line and the second branch line.

3. The perfusion loop assembly according to claim 1, wherein data from each sensor is transmitted to a control system for monitoring and/or controlling the perfusion loop assembly and/or manipulating devices depending on the measured sensor data.

4. The perfusion loop assembly according to claim 1, wherein the second branch line comprises at least one second gas exchanger.

5. The perfusion loop assembly according to claim 1, wherein the at least one first valve in the second branch line is a proportional pinch valve.

6. The perfusion loop assembly according to claim 1, wherein the at least one reservoir is a hard shell or soft shell reservoir close to a liver outlet.

7. The perfusion loop assembly according to claim 1, wherein a height of the at least one reservoir relative to the ex vivo liver is controlled by a linear motor for adjusting a liquid head.

8. The perfusion loop assembly according to claim 1, wherein a control system effects a desired pressure variation in the vena cava liver outlet branch, wherein the control system comprises at least one pinch valve in the vena cava line and/or an alternatingly adjusting of a height of the reservoir.

9. The perfusion loop assembly according to claim 1, wherein the perfusion loop assembly comprises at least one port for medication and/or liquid retrieval for analysis.

10. The perfusion loop assembly according to claim 1, comprising a dialysis machine to remove toxins and desired substances from the perfusion media.

11. The perfusion loop assembly according to claim 10, wherein the dialysis machine is connected to the liver chamber and the liver outlet line.

12. The perfusion loop assembly according to claim 1, comprising at least one monitoring, controlling, and/or processing device for bile produced by the ex vivo liver.

13. The perfusion loop assembly according to claim 12, wherein the monitoring, controlling and/or processing device uses measurements of the produced mass of the bile, optical parameters of the bile and/or the flow rate of the bile.

14. The perfusion loop assembly according to claim 1, wherein the temperature in the loop is in the range of 2° C. and normothermic conditions.

15. The perfusion loop assembly according to claim 1, comprising the second branch line including at least one second gas exchanger.

16. The perfusion loop assembly according to claim 1, comprising at least one monitoring, controlling, and/or processing device for ascites produced by the ex vivo liver.

17. The perfusion loop assembly according claim 16, wherein the monitoring, controlling and/or processing device uses measurements of the produced mass of the ascites, optical parameters of the ascites and/or the flow rate of the ascites.

18. The perfusion loop assembly according to claim 16, comprising at least one dialysis machine for removing toxins and urea from the ascites.

* * * * *